(12) United States Patent
Kawarai et al.

(10) Patent No.: US 8,093,978 B2
(45) Date of Patent: Jan. 10, 2012

(54) COIL COMPONENT

(75) Inventors: Mitsugu Kawarai, Chuo-ku (JP);
Tetsuo Yoshida, Chuo-ku (JP)

(73) Assignee: Sumida Corporation (JP)

(*) Notice: Subject to any disclaimer, the term of this patent is extended or adjusted under 35 U.S.C. 154(b) by 0 days.

(21) Appl. No.: 13/154,939

(22) Filed: Jun. 7, 2011

(65) Prior Publication Data

US 2011/0234351 A1    Sep. 29, 2011

Related U.S. Application Data

(63) Continuation of application No. PCT/JP2009/067706, filed on Oct. 13, 2009.

(30) Foreign Application Priority Data

Dec. 10, 2008    (JP) .................................. 2008-314874

(51) Int. Cl.
    *H01F 21/06*    (2006.01)
(52) U.S. Cl. ........................................ 336/130
(58) Field of Classification Search .......... 336/130–134,
    336/40, 45, 115, 117, 65, 83
    See application file for complete search history.

(56) References Cited

U.S. PATENT DOCUMENTS

| | | | |
|---|---|---|---|
| 5,225,941 A | 7/1993 | Saito et al. | |
| 6,337,732 B2 * | 1/2002 | Nakamura | 355/30 |

FOREIGN PATENT DOCUMENTS

| | | | |
|---|---|---|---|
| JP | 35-31752 | | 11/1960 |
| JP | 01-67713 | | 5/1989 |
| JP | 02311166 A | * | 12/1990 |
| JP | 05-4113 | | 6/1993 |
| JP | 08-213245 | | 8/1996 |
| JP | 08-286093 | | 11/1996 |
| JP | 2000-331840 | | 11/2000 |
| JP | 2008-091438 | | 4/2008 |

* cited by examiner

*Primary Examiner* — Tuyen Nguyen

(74) *Attorney, Agent, or Firm* — Harness, Dickey & Pierce, P.L.C.

(57) ABSTRACT

A coil component 1 includes: a pot core 2; a coil 10 for generating magnetic flux when a predetermined electric current is supplied; a piezoelectric actuator 15 for changing the position of a movable core portion 11 with respect to the coil 10 in response to a control signal supplied from the outside and for passing the movable core portion 11 through the magnetic flux of closed magnetic-path, which is generated by the coil 10. Also, the piezoelectric actuator 15 includes: a piezoelectric device 9 for creating displacement in parallel with the thickness direction caused by the control signal, a moving body 11 connected to the piezoelectric device 9 and the movable core portion 11 for moving the movable core portion 11 in response to the displacement which occurred for the piezoelectric device 9, and a friction-drive rod 13 for rendering the moving body 11 moved by the displacement which occurred for the piezoelectric device 9 to be stationary at a predetermined position.

11 Claims, 10 Drawing Sheets

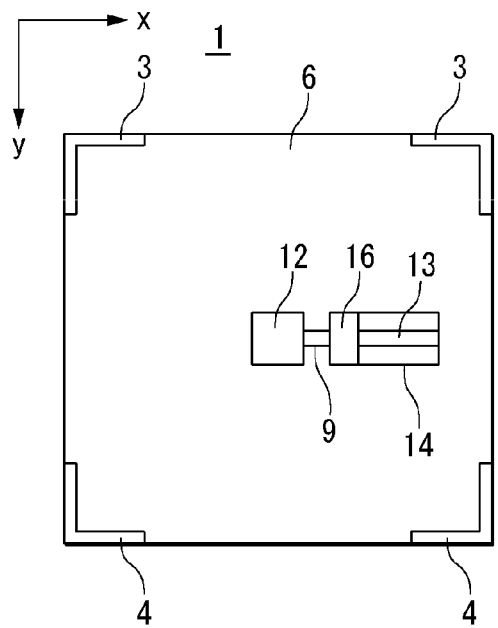
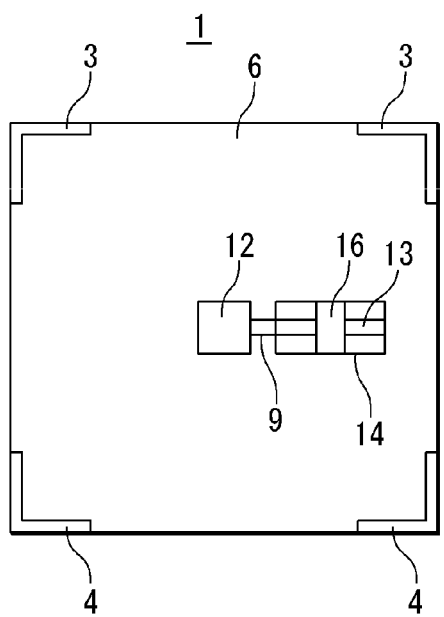
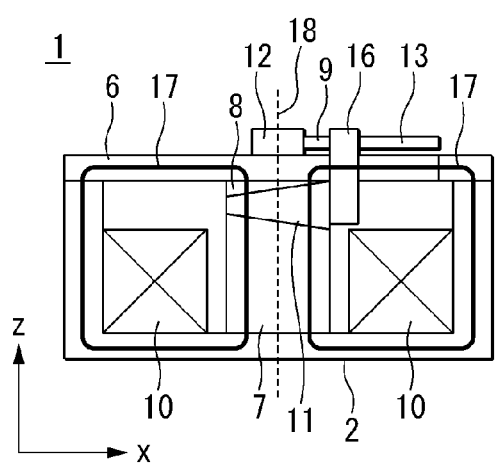
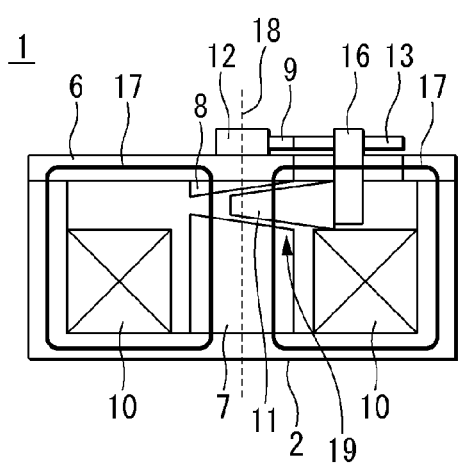

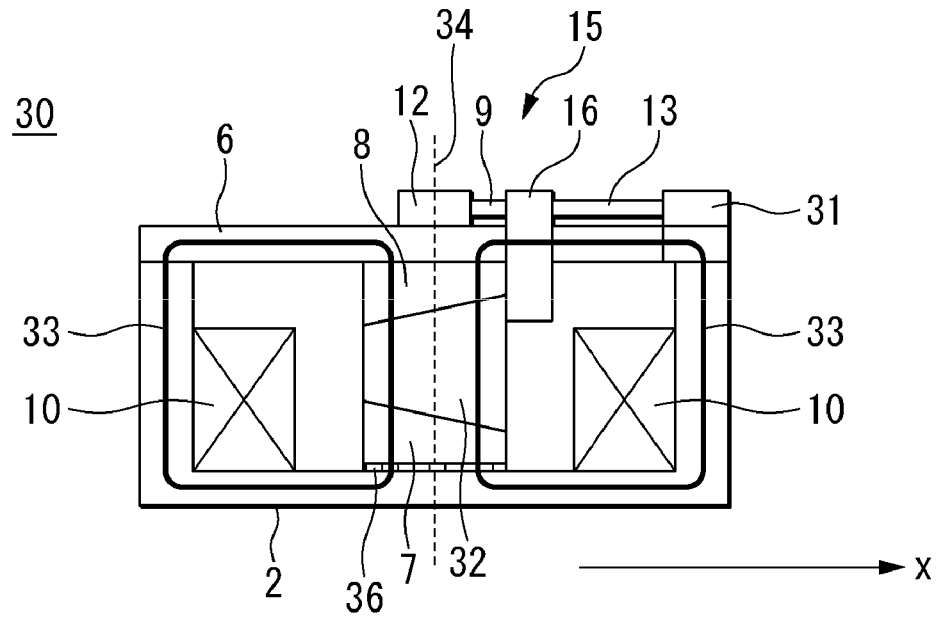
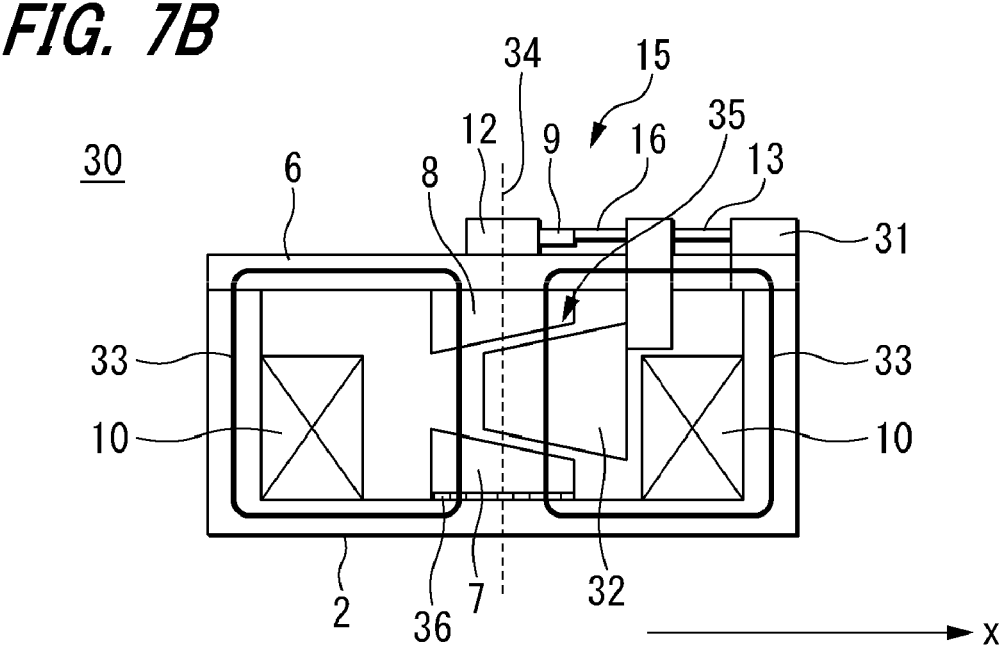

COIL COMPONENT

CROSS-REFERENCE TO RELATED APPLICATIONS

This application is a continuation of PCT/JP2009/067706 filed Oct. 13, 2009, which claims priority to Japanese Application No. 2008-314874 filed Dec. 10, 2008, both of which are hereby incorporated by reference in their entirety.

TECHNICAL FIELD

The present invention relate to a coil component which is suitable for being applied in a case, for example, in which an inductance value of a coil used in electronic equipment is to be changed.

BACKGROUND ART

From the past, there has been a coil component in which a position of a magnetic core with respect to a coil is changed by an external signal such that the inductance value of the coil can be changed. Such a coil component includes a coil, a magnetic core, a movable core which is used as a portion of the magnetic core and which changes the relative position with respect to the magnetic core, and an actuator for changing the position of the movable core. For the actuator, there is used a monomorph type or bimorph type piezoelectric device. The movable core is connected to a tip portion of the piezoelectric device. When a drive voltage is applied to the piezoelectric device, a piezoelectric body constituting the piezoelectric device expands and contracts and the relative position of the movable core with respect to the magnetic core changes. Consequently, it is possible to adjust the inductance value of the coil component.

In Patent Document 1, there is a description with respect to a coil component including a bimorph type piezoelectric device. In a state of not driving the piezoelectric device, a movable core portion bonded to the tip portion of the piezoelectric device is perfectly combined with the periphery core portion. When a voltage is applied to this piezoelectric device, the piezoelectric body is bent and deformed toward the direction moving away from the core portion. When the movable core portion moves toward the same direction as that of the piezoelectric body, a gap between the movable core portion and the core portion becomes larger, so that the inductance value becomes smaller.

In Patent Document 2, there is a description with respect to a variable inductance device for changing the inductance value by changing the relative position of two cores owing to an action of a piezoelectric actuator which uses a monomorph type piezoelectric device.

RELATED TECHNICAL DOCUMENTS

Patent Documents

In Patent Document 3, there is a description with respect to a coil component for adjusting the inductance value by changing a gap size between two cores arranged face to face by using a monomorph type piezoelectric device.
Patent Document 1: Japanese unexamined patent publication No. 2008-91438
Patent Document 2: Japanese unexamined patent publication No. H8-213245
Patent Document 3: Japanese unexamined patent publication No. 2000-331840

DISCLOSURE OF THE INVENTION

However, in the past technology, there were problems indicated as follows.
(1) For example, the displacement of the piezoelectric body constituting the bimorph type piezoelectric device was only several ten to several hundred micro meters ($\mu$m). Consequently, also the displacement of the magnetic core bonded at the tip portion of the bimorph type piezoelectric device becomes small and the range in which the inductance value changes was limited.
(2) In addition, in order to maintain the inductance value which was changed once, the relative position of the magnetic core with respect to the coil must not unchanged. Consequently, it is necessary to maintain the bending deformation of the piezoelectric device, but when continuing to apply the maintenance voltage for maintaining the bending deformation of the piezoelectric device to the coil component, it happens that the power consumed by the coil component will become larger. Consequently, it was difficult to mount a coil component whose inductance value can be changed on an electronic equipment for which power saving is required.
(3) In addition, for the bimorph type piezoelectric device, there is arranged an elastic plate between two layers of piezoelectric bodies thereof. This elastic plate vibrates when the piezoelectric body is deformed by receiving deformation stress. Consequently, it happens that some time period is required until the inductance value of the coil component is stabilized. In addition, the bimorph type piezoelectric device vibrates also in a case in which vibration or shock is applied from the outside, so that it sometimes happened that error occurred for the inductance value.

The present invention was invented in view of such a situation and is addressed to make it easy to maintain the inductance value which was changed once while setting the variation of the inductance value to be larger.

A coil component relating to the present invention includes: a magnetic core, a coil for generating magnetic flux when a predetermined electric current is supplied, an actuator for changing the position of a movable core with respect to the coil in response to a control signal supplied from the outside and for passing the movable core through the magnetic flux generated by the coil.

The actuator includes: a piezoelectric device for creating displacement in parallel with the thickness direction caused by the control signal, a moving body connected to the movable core for moving the movable core in response to the displacement which occurred for the piezoelectric device, and a stationary unit connected to the piezoelectric device and the moving body for rendering the moving body moved by the displacement which occurred for the piezoelectric device to be stationary at a predetermined position.

By doing in this manner, it became possible for the actuator to change the inductance value by moving a moving body connected with a movable core with respect to the coil.

With respect to a coil component relating to the present invention, the inductance value of the coil component is changed by changing the magnetic path constitution or changing the distance relative to the coil owing to a fact that the actuator moves a moving body connected with a movable core. Consequently, the adjustment range of the inductance value becomes higher and concurrently, power for maintaining the inductance value which is changed once becomes unnecessary. Also, the response speed of the inductance value becomes speedy and therefore, the coil component can be mounted on various kinds of electric equipment starting from a digital power supply. In addition, the number of the constituent elements is small, so that it becomes possible to realize miniaturization.

BRIEF DESCRIPTION OF DRAWINGS

FIGS. 2A and 2B are constitution diagrams showing an example of the coil component in case of being plan-viewed in the first exemplified embodiment of the present invention;

FIGS. 3A and 3B are constitution diagrams showing an example of the coil component in case of being side-viewed in the first exemplified embodiment of the present invention;

FIGS. 7A and 7B are constitution diagrams showing an example of a coil component in a second exemplified embodiment of the present invention;

BEST MODE FOR CARRYING OUT THE INVENTION

First Exemplified Embodiment

Hereinafter, it will be explained with respect to a first exemplified embodiment of the present invention with reference to FIG. 1 to FIG. 6. In this exemplified embodiment, it will be explained, for example, with respect to an example applied to a coil component 1 which is employed in small-sized electronic equipment or electronic circuit.

Figure 1A:
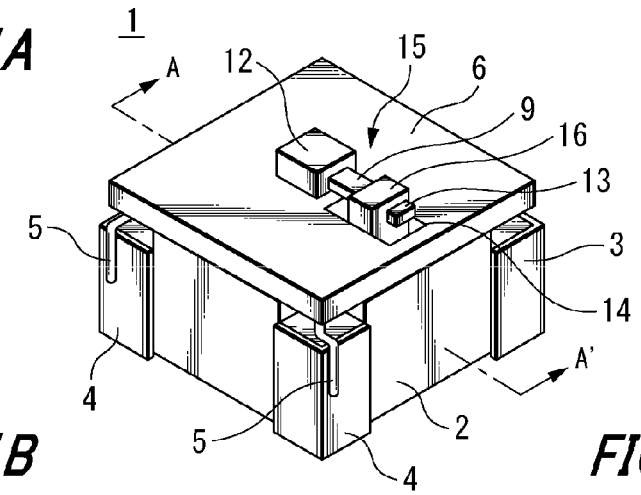
FIGS. 1A, 1B and 1C are constitution diagrams showing an example of a coil component in a first exemplified embodiment of the present invention.
Figure 1B:
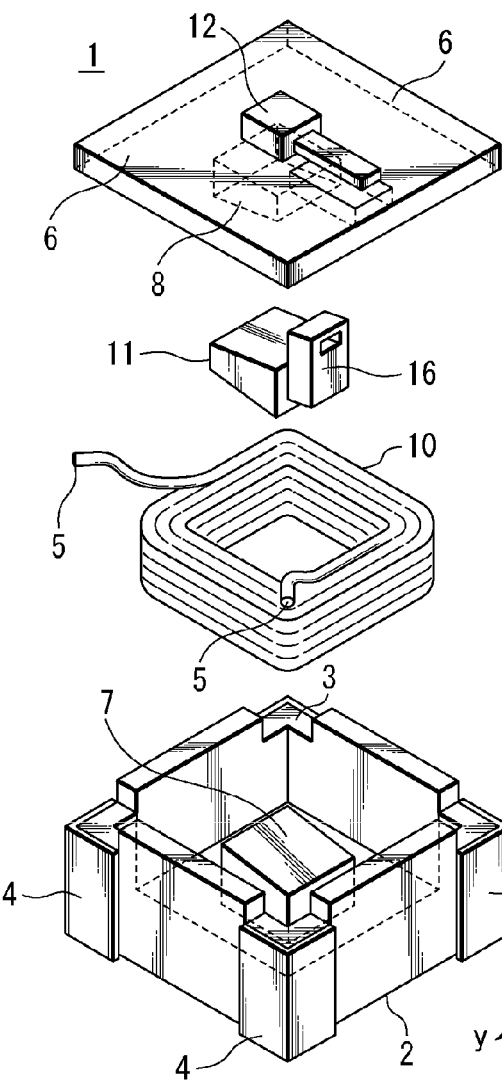
Figure 1C:
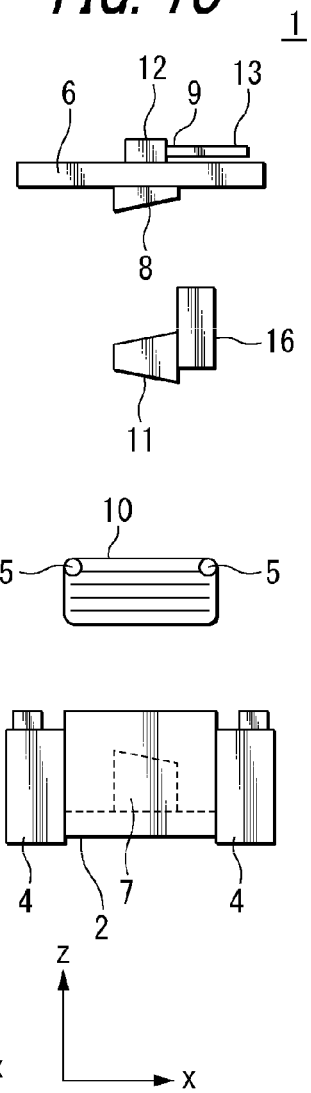

FIGS. 1A, 1B and 1C show a constitution example of a coil component 1.

FIG. 1A is an external appearance perspective view of the coil component 1 of a rectangular parallelepiped shape.

The coil component 1 includes a pot core 2 of a magnetic body, which is formed by integrally molding a bottom surface and four surfaces perpendicular with respect to the bottom surface, and a flat plate core 6 covering the upper portion of the coil component 1 in which the external shape thereof is constituted by the pot core 2 and the flat plate core 6. The pot core 2 and the flat plate core 6 have a function for protecting a built-in coil 10 (see FIG. 1B described later) and concurrently, for producing a magnetic path by taking-in the magnetic flux which the coil 10 generates. On the flat plate core 6, there is installed a piezoelectric actuator 15 which moves a movable core portion 11 owing to an action of the piezoelectric body.

The piezoelectric actuator 15 includes a piezoelectric device 9 which expands and contracts by being applied with voltage, and an actuator base 12 for supporting one end of the piezoelectric device 9. The actuator base 12 is a base board fixed by an adhesive agent or the like in a vicinity of a center portion of the upper surface of the flat plate core 6. On the other terminal of piezoelectric device 9, there is attached a friction-drive rod 13 having a predetermined static friction coefficient. Also, on the flat plate core 6, there is formed a rectangle hole 14 in the x direction. The rectangle hole 14 is a through-hole formed by being passed through the flat plate core 6 in a direction parallel with the displacement direction of the piezoelectric device 9 and a moving body 16 is made to be movable along the rectangle hole 14. The moving body 16 mounted on the friction-drive rod 13 of this embodiment moves in ±x directions inside the rectangle hole 14 caused by the expansion and contraction of the piezoelectric device 9 functioning as a vibrator which vibrates by being applied with voltage.

At four corner portions of the pot core 2, there are formed actuator connection electrodes 3 for supplying electric current to the piezoelectric device 9 and inductor connection electrodes 4 for supplying electric current to the coil 10 respectively by pairs of electrodes. The inductor connection electrodes 4 are respectively connected with both the terminal portions of coil terminal portion 5 which corresponds to both the terminal portions of the built-in coil.

FIG. 1B is an exploded perspective view of the coil component 1.

The air core coil 10 is housed inside a pot core 2 composed of a magnetic body in which at least one surface thereof is formed as an opening portion and inside a flat plate core 6 composed of the magnetic body which is placed by being fitted with the opening portion. The pot core 2 is a magnetic core whose material is selected to be sintered ferrite, a metal-based magnetic material or the like. Magnetic permeability of the pot core 2 is high, so that it is easy for the magnetic flux generated by the coil 10 to pass therethrough. Consequently, the pot core 2 represses leakage magnetic flux owing to a fact that it is formed in a shape of surrounding the whole coil 10. In this embodiment, the pot core 2 is formed approximately in a box shape and has also a function as a container which houses the coil 10, the moving body 16 and the like.

The four corner portions of the pot core 2 are formed to have lower height sizes compared with those of other circumferential wall members. On these four corner portions, there are placed a pair of actuator connection electrodes 3 and a pair of inductor connection electrodes 4 respectively by a pair of electrodes. The actuator connection electrodes 3 are used for connecting the laminated-type piezoelectric device 9 which is largely displaced expansively and contractively by being applied with voltage and the mounting substrate which is not shown and on which the coil component 1 is mounted. Then, the actuator connection electrodes 3 are connected to external electrodes for making connections to internal electrodes of the piezoelectric actuator 15 and connected to the mounting substrate. Then, the voltage is supplied to the piezoelectric device 9 from the outside. On the other hand, the inductor connection electrodes 4 are used for connecting the coil terminal portions 5 and the mounting substrate which is not shown and on which the coil component 1 is mounted. The inductor connection electrodes 4 supply the electric current from the outside to the coil 10.

In a vicinity of the center of the bottom surface of the pot core 2, which is inside the pot core 2 and the flat plate core 6, there is formed a trapezoid shaped fixed core portion 7 (center-core of pot core) which is fitted with the shape of the movable core portion 11 along the winding axis direction of the coil 10. In the vicinity of the fixed core portion 7, there is arranged the coil 10. The coil 10 is formed by an electric conductive wire being wound around the air core by using general means. For the electric conductive wire used for the coil 10, an insulation film is coated at the periphery of a copper core thereof. Further, for the surface portion of the insulation film, it is desirable to use a so-called self-bonding wire coated with a film which will be dissolved by heating, by coating of an organic solvent, by ultraviolet ray radiation or the like. When forming the coil 10 by using the self-bonding wire, the coil shape wound around the air core can be held. Further, in a post-assembly process or the like, it becomes easy for the coil 10 to be handled.

The flat plate core 6 is a core whose material is selected to be sintered ferrite, a metal-based magnetic material or the like. The flat plate core 6 has a high magnetic permeability and has a property that it is easy for the magnetic flux to pass therethrough. The flat plate core 6 is made to have a shape for surrounding the whole coil by being combined with the pot core 2 and has a function of repressing the leakage magnetic flux. For the flat plate core 6, there is cut out a rectangle hole 14 which has the same width as the width in the y direction of the moving body 16 from the edge of the fixed piezoelectric actuator (vibrator) to the end side direction and also, which has the same length as that of the moving distance of the moving body 16. Further, in a vicinity of the lower surface center of the flat plate core 6, there is formed a fixed core portion 8 whose lower end surface is formed to be aslant with respect to the wide width surface of the flat plate core 6. In this manner, the magnetic core including the core portion is divided into the fixed core portions 7, 8 and the movable core portion 11.

The fixed core portions 7, 8 are cores which are installed at the center portions of the flat plate core 6 and the pot core 2 respectively. The fixed core portions 7, 8 are formed by using a material obtained by sintering a ferrite or a material of a metal-based magnetic material or the like and have high magnetic permeability, and it is easy for the magnetic flux to pass therethrough. The upper end surface of the fixed core portion 7 is cut aslant with respect to the bottom surface of the pot core 2. On the other hand, the lower end surface of the fixed core portion 8 is cut in an aslant shape with respect to the plane surface of the flat plate core 6. The magnetic flux generated by the coil 10 is passed inside of the fixed core portions 7, 8 and the movable core portion 11. Then, the lower end surface of the fixed core portion 8 installed at the center portion of the lower surface of the flat plate core 6 and the upper end surface of the fixed core portion 7 installed at the center of the pot core 2 are formed both in wedge-receiving shapes and are formed so as to engage respectively with the corresponding facing surfaces of the movable core portion 11.

Also the movable core portion 11 is formed by using a material of a sintered ferrite, a metal-based magnetic material or the like. The movable core portion 11 has high magnetic permeability and has a property in which it is easy for the magnetic flux to pass therethrough. The movable core portion 11 is formed as a hexahedron shape whose vertical cross-section shape forms a trapezoid. Within the surfaces forming the movable core portion 11, the corresponding surfaces facing the fixed core portions 7, 8 are formed in wedge shapes which are easily detached and the bottom surface is connected with the moving body 16. The surfaces corresponding to the inclined side portions of the trapezoid shape thereof are formed in shapes which are fitted with the upper end surface of the fixed core portion 7 formed on the pot core 2 and the lower end surface of the fixed core portion 8 formed on the flat plate core 6 when being combined therewith. Consequently, in a state in which the voltage is not applied (initial state), even if the coil component 1 is assembled, the fixed core portions 7, 8 and the movable core portion 11 continue to be stationary by being contacted one another, and the inductance value: L does not change. On the other hand, when applying a drive signal voltage, the movable core portion 11 moves caused by the expansion and contraction displacement of the piezoelectric device 9, so that the inductance value: L changes.

The friction-drive rod 13 has a certain strength and hardness and it is a rod shaped support member having an appropriate friction coefficient with respect to the moving body 16, and it is connected to the piezoelectric device 9 and the moving body 16. There is sometimes a case in which guide grooves for the moving body 16 are formed on both the sides of the friction-drive rod 13. Further, in order to prevent the dropout of the moving body 16, there is also a case in which a stopper is installed on the air-floating end of the friction-drive rod 13. One end of the moving body 16 is inserted into the rectangle hole 14, and there is mounted with the friction-drive rod 13 on it. The moving body 16 moved by the displacement which occurred for the piezoelectric device 9 is made to be stationary at a predetermined position. At the other end of the moving body 16, the movable core portion 11 is fixed by means of an adhesive agent or the like. In this manner, the moving body 16 is made to be in a so-called cantilever structure. Further, there exists a proper friction coefficient with respect to the friction-drive rod 13 inserted into the moving body 16.

The piezoelectric device 9 is a vibrator which is mounted between the actuator base 12 and the friction-drive rod 13. Generally, it is constituted intersectionally by a laminated piezoelectric material having layers from several layers to tens of layers, internal electrodes and external electrodes. The displacement of the laminated piezoelectric body is small (several μm), but there is an advantage such that the response speed is speedy and also the generation force is large. Further, in the present invention, there is utilized not the displacement of the piezoelectric material but the displacement of the moving body 16, so that it is possible to overcome such a defect, as mentioned above, that the displacement of the laminated piezoelectric body is small. It should be noted that it is allowed for the piezoelectric device constituting the piezoelectric device 9 not to be a laminated piezoelectric body but to be a monomorph type or bimorph type piezoelectric device. In case of using a bimorph type piezoelectric device for the piezoelectric device 9, there is employed a constitution in which the moving body 16 is moved caused by the vibration of the bimorph type piezoelectric device and the movement thereof is made to be the displacement of the movable core portion 11.

The piezoelectric device 9 which is applied with the drive signal (signal voltage) is displaced expansively and contractively by setting the actuator base 12 to be a fixed point. Owing to the expansive and contractive displacement of the piezoelectric device 9, it is made possible for the movable core portion 11 to move toward the direction perpendicular to the magnetic flux excited by the coil 10. As a result thereof, there is formed a variable magnetic gap in the magnetic path which is formed by the pot core 2—the fixed core portion 7—the movable core portion 11—the fixed core portion 8—the flat plate core 6—the pot core 2. Depending on the drive signal (signal voltage) applied to the piezoelectric device 9, the variable magnetic gap size is adjusted.

FIG. 1C is an example of an exploded perspective view in which the coil component 1 shown in FIG. 1B is plan-viewed from the +y direction.

For the respective members therein, there are put the same reference numerals as those in FIG. 1B. It should be noted that the constitution of the coil component 1 has a similar constitution as that of the coil component 1 shown in FIG. 1B, so that the detailed explanation thereof will be omitted. With reference to FIG. 1C, it is understood that the fixed core portion 8 is formed downward with respect to the flat plate core 6.

It should be noted that the illustration by a drawing is omitted, but with respect to the constitution mentioned above, it is allowed for avoiding a shock of the moving body 16 and the piezoelectric actuator 15 to employ such a constitution in which a stopper is used at the end portion of the friction-drive rod (see FIG. 7 mentioned later) or the movable core portion 11 is perfectly engaged with the fixed core portions 7, 8. Also, in order to make the moving body 16 not contact the piezoelectric actuator 15, a method or the like is conceivable in which, for example, the movable core portion 11 is to be formed a little longer in the x direction and also, the moving body 16 is to be formed in an approximately L-shape type.

FIGS. 2A and 2B show constitution examples of the plan-viewed coil component 1.

FIG. 2A shows an example of the coil component 1 in an initial state.

In the initial state, the piezoelectric actuator 15 is not driven, so that the moving body 16 becomes stationary in a state of being contacted to the left end of the rectangle hole 14.

FIG. 2B shows an example of the coil component 1 after applying a drive signal voltage.

When the piezoelectric actuator 15 is driven, the moving body 16 moves gradually toward the +x direction. However, the moving region of the moving body 16 is limited within the region of the length of the rectangle hole 14.

FIGS. 3A and 3B show situations in which the piezoelectric actuator 15 is driven by using the examples of the cross-section diagram along the A-A' line of the coil component 1 in FIG. 1.

FIG. 3A shows an example of the coil component 1 in an initial state.

In the initial state, the fixed core portions 7, 8 and the movable core portion 11 are contacted one another and form one center-core of pot core. At that time, the drive signal (signal voltage) is not applied to the piezoelectric device 9 and the movable core portion 11 does not move. Consequently, for the coil component 1, there is formed the magnetic path 17 in a sequential order of the pot core 2—the fixed core portion 7—the movable core portion 11—the fixed core portion 8—the flat plate core 6—the pot core 2. Then, the fixed core portions 7, 8 and the movable core portion 11 are aligned on the same axis line 18 and the magnetic gap thereof is in a minimum state. At that time, there only exist boundary surfaces among the fixed core portion 7, the movable core portion 11 and the fixed core portion 8. In this state, when the electric current is applied to the coil 10, a high inductance value: L can be obtained.

FIG. 3B shows an example of the piezoelectric actuator 15 after applying the drive signal voltage.

When the drive signal (signal voltage) is applied to the piezoelectric device 9, the movable core portion 11 moves away toward the +x direction with respect to the fixed core portions 7, 8. At that time, for the coil component 1, there is formed the magnetic path 17 in a sequential order of the pot core 2—the fixed core portion 7—the movable core portion 11—the fixed core portion 8—the flat plate core 6—the pot core 2. Then, it becomes a state in which the movable core portion 11 is deviated from the fixed core portions 7, 8 and on the same axis line 18, there is formed a magnetic gap 19 at the upper and lower end surfaces of the movable core portion 11. In this state, when the electric current is applied to the coil 10, the inductance value: L becomes low compared with that in a state of FIG. 3A.

Figure 4:
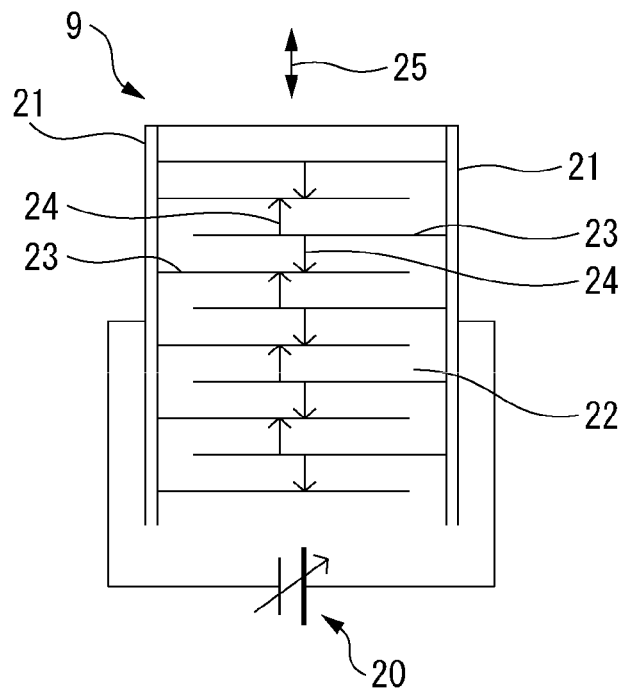
FIG. 4 is an explanatory diagram showing a constitution example and an operation example of a piezoelectric device in the first exemplified embodiment of the present invention.

FIG. 4 shows a constitution example and an operation example of the piezoelectric device 9.

The piezoelectric device 9 includes external electrodes 21 becoming voltage terminals for a voltage source 20 which applies a predetermined voltage, a laminated piezoelectric body 22 which is laminated with a plurality of layers of piezoelectric materials and internal electrodes 23 which are installed on the laminated surfaces of the laminated piezoelectric body 22. The laminated piezoelectric body 22 is formed in a state of being sandwiched among the external electrodes 21 and the internal electrodes 23. When a predetermined voltage is applied from the voltage source 20, the laminated piezoelectric body 22 is polarized in arrow 24 directions. The displacement caused by each layer of the polarized laminated piezoelectric body 22 is very small, but owing to a fact that the plurality of layers of piezoelectric bodies are polarized concurrently, there occurs a large displacement in an arrow 25 direction. Also, the piezoelectric device 9 which is formed by being laminated with piezoelectric bodies is applied with the voltage in parallel for every one layer, so that it is possible to obtain the same displacement depending on a voltage having a value reduced to 1/(lamination number) compared with a case of the block having an identical size. In this manner, by forming the piezoelectric device 9 as a laminated type, it becomes possible to set the drive voltage of the piezoelectric device 9 to be lower.

Figure 5A:
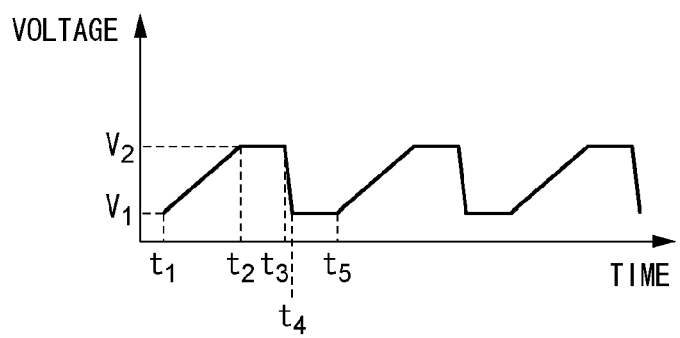
FIGS. 5A and 5B are explanatory diagrams showing an example of change associated with time transition of the voltage applied to a piezoelectric actuator in the first exemplified embodiment of the present invention.
Figure 5B:
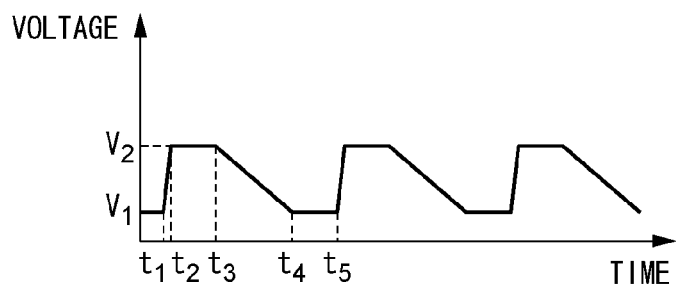

FIGS. 5A and 5B show examples of changes along with time transitions of the voltage applied to the piezoelectric device 9 in case of driving the piezoelectric actuator 15. In this graph, the horizontal axis indicates time and the vertical axis indicates voltage.

FIG. 5A shows an example of a change amount of the voltage in which the movable core portion 11 is moved toward the direction (+x direction) moving away from the fixed core portion 7, 8.

The piezoelectric actuator 15 is applied with the signal voltage within a range of voltages from $V_1$ to $V_2$ in which the relation of $V_1 < V_2$ is satisfied. During the time period from $t_1$ to $t_2$, the voltage changes from voltage $V_1$ to voltage $V_2$ gradually and during the time period from $t_2$ to $t_3$, a constant voltage $V_2$ is applied. Then, during the time period from $t_3$ to $t_4$, the voltage is lowered rapidly from the voltage $V_2$ to the voltage $V_1$. Here, there is established a relation of $(t_2 - t_1) >$ ($t_4$–$t_3$). Then, during the time period from $t_4$ to $t_5$, a constant voltage $V_1$ is applied. When this voltage change is repeated, the movable core portion 11 moves away from the fixed core portion 7, 8.

FIG. 5B shows an example of a change amount of the voltage in which the movable core portion 11 is moved toward the direction (–x direction) approaching to the fixed core portion 7, 8.

The piezoelectric actuator 15 is applied with the signal voltage within a range of voltages from $V_1$ to $V_2$ in which the relation of $V_1$<$V_2$ is satisfied. During the time period from $t_1$ to $t_2$, the voltage changes from voltage $V_1$ to voltage $V_2$ rapidly and during the time period from $t_2$ to $t_3$, a constant voltage $V_2$ is applied. Then, during the time period from $t_3$ to $t_4$, the voltage changes gradually from the voltage $V_2$ to the voltage $V_1$. Here, there is established a relation of ($t_2$–$t_1$)<($t_4$–$t_3$). Then, during the time period from $t_4$ to $t_5$, a constant voltage $V_1$ is applied. When this voltage change is repeated, the movable core portion 11 approaches to the fixed core portion 7, 8.

Next, a specific operation example of the piezoelectric actuator 15 will be explained.

As mentioned above, the piezoelectric actuator 15 includes the piezoelectric device 9, the actuator base 12, the friction-drive rod 13 and the moving body 16. When the voltage is applied gradually to the piezoelectric device 9, caused by a phenomenon that the laminated piezoelectric body 22 is extended for every layer thereof, also the friction-drive rod 13 which is engaged with one end of the piezoelectric device 9 depending on the action of the static frictional force concurrently moves (toward +x direction in FIG. 1). Consequently, also the moving body 16 fixed on the friction-drive rod 13 moves similarly as the friction-drive rod 13 depending on the action of the static frictional force. Thereafter, by quickly lowering the voltage which is applied to the piezoelectric device 9, the laminated piezoelectric body 22 shrinks rapidly toward the –x direction. Consequently, similarly the friction-drive rod 13 moves toward the opposite direction of the proceeding direction (toward –x direction), too. However, the inertia force of the moving body 16 has a quantity of the dynamic frictional force or more, so that the moving body 16 carries out either one operation of stopping at the original position or returning to a position a little bit toward the –x direction. By repeating this operation, it is possible to move the moving body 16 (movable core portion 11) to a desired position and to make it stationary at this position.

Figure 6A:
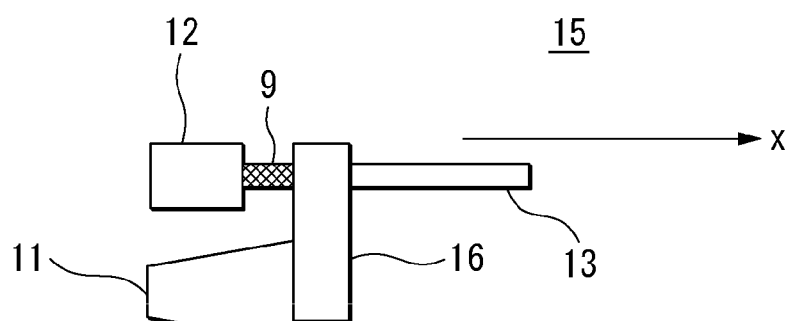
FIGS. 6A, 6B and 6C are explanatory diagrams showing an operation example of the piezoelectric actuator in the first exemplified embodiment of the present invention.
Figure 6B:
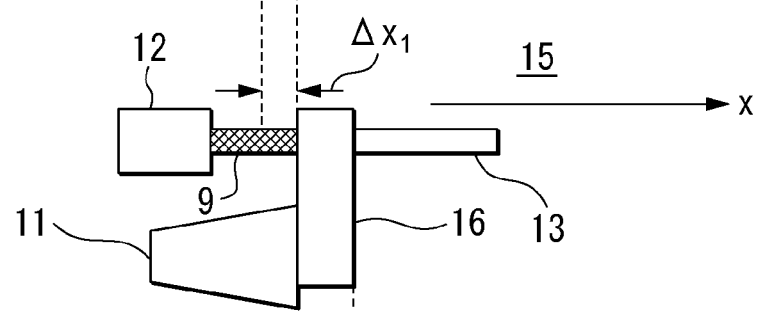
Figure 6C:
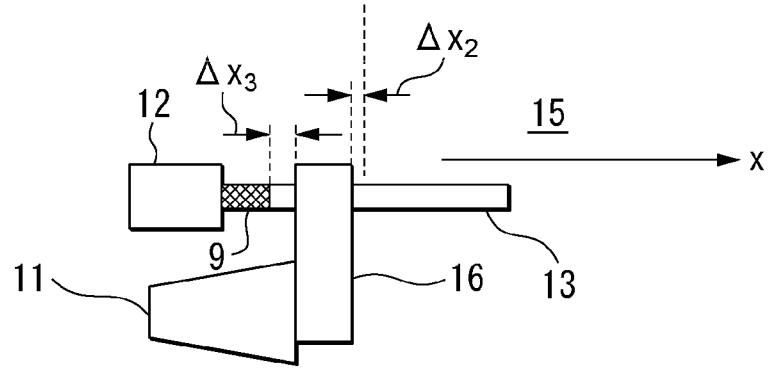

FIGS. 6A, 6B and 6C show operation examples of the piezoelectric actuator 15 which is driven in response to the change of the voltage shown in FIG. 5 by being enlarged.

As described above, the piezoelectric actuator 15 moves the movable core portion 11 depending on a phenomenon that the voltage applied to the piezoelectric device 9 changes. Here, in a case in which the voltage applied to the piezoelectric device 9 is raised, the piezoelectric device 9 is extended in parallel with the thickness direction and the friction-drive rod 13 makes the moving body 16 stationary at the position of the displacement which occurred for the piezoelectric device 9. On the other hand, in a case in which the voltage applied to the piezoelectric device 9 is lowered in a short time period compared with the time period during which the voltage was applied, the piezoelectric device 9 returns to one having the original length by being shrunk in parallel with the thickness direction and the friction-drive rod 13 makes the moving body 16 stationary in a vicinity of the position of the displacement which occurred for the piezoelectric device 9.

Hereinafter, it will be explained with respect to an embodiment in case of applying the voltage to the piezoelectric actuator 15 and moving the movable core portion 11 toward the +x direction.

FIG. 6A shows an example of the piezoelectric actuator 15 in an initial state.

In this state, the voltage is not applied to the piezoelectric actuator 15, so that the movable core portion 11 and the moving body 16 do not move.

FIG. 6B shows a state in which the voltage is applied to the piezoelectric actuator 15 during a time period from $t_1$ to $t_2$ (see FIG. 5A).

The voltage applied to the piezoelectric actuator 15 changes from the voltage $V_1$ to the voltage $V_2$ during the time period from $t_1$ to $t_2$ and the piezoelectric device 9 is extended by an amount of $\Delta x_1$ toward the +x direction. Then, along with the deformation of the piezoelectric device 9, the moving body 16 moves toward the +x direction, so that the movable core portion 11 connected to the moving body 16 also moves toward the +x direction. It should be noted that the actuator base 12 does not move because it is fixed on the flat plate core 6.

FIG. 6C shows a state in which the voltage was applied to the piezoelectric actuator 15 during a time period from $t_3$ to $t_4$ (see FIG. 5A).

At that time, the voltage applied to the piezoelectric actuator 15 is lowered rapidly from the voltage $V_2$ to the voltage $V_1$ during a very short time (from time point $t_3$ to $t_4$) and the length of the piezoelectric device 9 returns to the original length shown in FIG. 6A. However, the movable core portion 11 and the moving body 16 have weights, so that they stay at the position shown in FIG. 6B or return to a position a little toward the –x direction caused by the inertia force. In this embodiment, the movable core portion 11 and the moving body 16 return by an amount of $\Delta x_2$ toward the –x direction and become stationary in a state of being moved by an amount of $\Delta x_3$ toward the +x direction. At that time, the relation of $\Delta x_1 = \Delta x_2 + \Delta x_3$ is satisfied.

The displacement $\Delta x_3$ is very small, but it is possible to move the movable core portion 11 and the moving body 16 to a desired position by repeating the patterns applied with the voltage, which are shown in FIG. 5A. Consequently, it is possible to adjust the inductance value of the coil component 1 suitably.

Then, when repeating a process in which the voltage is applied to the piezoelectric actuator 15 additively little by little and thereafter, the voltage is lowered quickly, the moving body 16 moves away from the actuator base 12 gradually. Also the movable core portion 11 fixed at the moving body 16 moves similarly toward the direction moving away from the fixed core portion 7, 8, so that the gap of the center-core of the coil 10 becomes larger. Consequently, the inductance value of the coil 10 becomes smaller.

In addition, if changing the voltage applied to the piezoelectric device 9 so as to increase quickly and thereafter, to lower gradually, the moving body 16 moves so as to approach to the actuator base 12 and also the movable core portion 11 approaches to the fixed core portion 7, 8 all together. Consequently, the inductance value of the coil component 1 becomes larger.

It should be noted that in case of moving the movable core portion 11 and the moving body 16 toward the –x direction, it is carried out by repeating the patterns applied with the voltage, which are shown in FIG. 5B. The explanation will be omitted with respect to this operation example.

According to the coil component 1 relating to the first exemplified embodiment explained above, by using the piezoelectric actuator 15, the moving distance with respect to the position in the initial state of the movable core portion 11 becomes long and it is possible to change the inductance value largely. At that time, by repeating the voltage applied to the piezoelectric actuator 15 with a predetermined pattern, it is possible to move the movable core portion 11 either of toward the direction of moving away from or approaching to the fixed core portion 7, 8. Also, the displacement of the movable core portion 11 is very small, so that there is such an effect that it is easy to be adjusted for obtaining a desired inductance value.

With respect to the piezoelectric device 9, the displacement value thereof for every time is small and therefore, it is possible to control the movable core portion 11 so as to be moved by an arbitrary amount of movement by controlling parameters relating to the voltage waveform such as frequency, rising-up time, holding time, falling time, a peak value and the like of the voltage applied to the piezoelectric device 9. Consequently, it is possible to be adjusted accurately for obtaining a desired inductance value. Further, the piezoelectric device 9 responds even if a signal voltage of high frequency is applied thereto, so that there is such an effect that also increasing the operation speed can be expected.

Also, it is allowed not to apply any voltage to the piezoelectric actuator 15 for maintaining the moved movable core portion 11 at a predetermined position. Consequently, any maintenance power is unnecessary and it becomes advantageous from a view point of power saving of the coil component 1. In addition, it is possible to make the movable core portion 11 stationary at an arbitrary position and it is also possible to carry out the position adjustment accurately. As a result thereof, it is possible to mount the coil component 1 on various kinds of electronic equipment which uses a digital power supply as a voltage source, so that applicability thereof is high.

Second Exemplified Embodiment

Next, it will be explained with respect to a constitution example of a coil component 30 relating to a second exemplified embodiment of the present invention with reference to FIG. 7. However, the basic constitution and operation of the coil component 30 are similar to those of the coil component 1 relating to the first exemplified embodiment mentioned above.

Consequently, in the explanation hereinafter, the same reference numerals are put on the portions corresponding to those in FIG. 1, which were already explained in the first exemplified embodiment and the detailed explanations thereof will be omitted.

FIGS. 7A and 7B show, similarly as FIG. 3, situations in which the piezoelectric actuator 15 is driven as an example of the cross-section diagram along the A-A' line of the coil component 1 in FIG. 1.

FIG. 7A shows an example of the coil component 30 in an initial state.

The coil component 30 includes a holding base 31 at the edge of the flat plate core 6 as a holding portion for holding the other end of the friction-drive rod 13. The holding base 31 is fixed on the flat plate core 6 by an adhesive agent similarly as the actuator base 12. The holding base 31 includes a function, together with the actuator base 12, for repressing the vibration of the friction-drive rod 13.

The holding base 31 holds the friction-drive rod 13 so as not to disturb the expansion and contraction displacement of the other end thereof, so that there is no fear of vibration or dropout from the rod with respect to a movable core portion 32. Consequently, it is possible to form the movable core portion 32 having a larger shape than that of the movable core portion 11 relating to the first exemplified embodiment mentioned above. At that time, by forming a fixed gap 36 between the boundary surfaces of the pot core 2 and the fixed core portion 8 by using an insulation material of an insulation resin or the like, it is possible to reduce the inductance value and to improve superimposing characteristic (decrease of inductance when flowing large electric current).

It is preferable for the fixed gap 36 to be used in a case, for example, in which the coil component 30 is mounted on a power supply system circuit to which a large electric current is supplied. However, even in a case in which the coil component 30 is mounted on such a power supply system circuit, it is not indispensable to form the fixed gap 36 if there is no influence to the superimposing characteristic or the like.

In the initial state shown in FIG. 7A, the fixed core portions 7, 8 and the movable core portion 32 are contacted one another and form one single center-core of pot core. At that time, the drive signal (signal voltage) is not applied to the piezoelectric device 9 and the movable core portion 32 does not move. Consequently, for the coil component 1, there is formed the magnetic path 33 in a sequential order of the pot core 2—the fixed core portion 7—the movable core portion 32—the fixed core portion 8—the flat plate core 6—the pot core 2. Then, the fixed core portions 7, 8 and the movable core portion 32 are aligned on the same axis line 34 and the magnetic gap thereof is in a minimum state. At that time, there only exist boundary surfaces between the fixed core portions 7, 8 and the movable core portion 32. In this state, when the electric current is applied to the coil 10, a high inductance value: L can be obtained.

FIG. 7B shows an example of the coil component 30 in a state in which the piezoelectric device 9 is driven.

When the drive signal (signal voltage) is applied to the piezoelectric device 9, the movable core portion 32 moves away toward the +x direction with respect to the fixed core portions 7, 8. At that time, for the coil component 1, there is formed the magnetic path 33 in a sequential order of the pot core 2—the fixed core portion 7—the movable core portion 32—the fixed core portion 8—the flat plate core 6—the pot core 2. Then, it becomes in a state in which the movable core portion 32 is deviated from the fixed core portions 7, 8 with respect to the same axis line 34, there is formed a magnetic gap 35 at the upper and lower end surfaces of the movable core portion 32. In this state, when the electric current is applied to the coil 10, the inductance value: L becomes low compared with that in a state of FIG. 7A.

Figure 8:
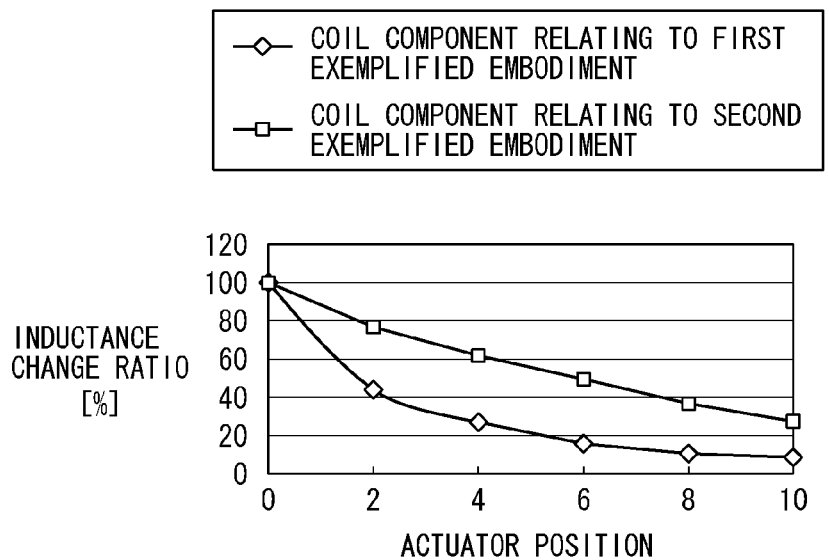
FIG. 8 is an explanatory diagram showing an example of change ratios of inductance values with respect to the positions of the piezoelectric actuators of the coil components in the first and second exemplified embodiments of the present invention.

FIG. 8 shows an example of relations between the actuator positions of the coil components 1, 30 and the change ratios of the inductance.

The wording "actuator position" expresses a positional relation of the piezoelectric actuator 15 of the moving body 16 in a case in which the maximum moving distance (termination point) of the moving body 16 is assumed to be 10, the minimum moving distance is assumed to be 0 (starting point) and the space between the starting point and the termination point is equally divided by 10 positions. Here, it will be explained with respect to the change ratios of the inductance values of the coil components 1, 30 relating to the first and the second exemplified embodiments.

In a case in which the position of the piezoelectric actuator 15 is 0, the inductance change ratios of the coil components 1, 30 are assumed to be 100 respectively. Then, as the actuator position increases, the change ratio of the inductance value will decrease. Here, it is understood that the decreasing degree of the change ratio of the coil component 1 is large compared with that of the coil component 30. Consequently, it is possible to make the change of the inductance value large by a very small change of the actuator position if the coil component 1 is used.

It should be noted in the coil components relating to the first and the second exemplified embodiments mentioned above that there are employed constitutions with respect to the end surfaces of the fixed core portions 7, 8 in which the end surfaces of the movable core portions 11, 32 are overlapped obliquely with respect to the x-y plain. However, it is allowed to make the end surfaces of the fixed core portions 7, 8 to be parallel with respect to the x-y plain, to provide an air gap such that the respective end surfaces do not contact each other and to provide a plate which is a little bit thinner than the thickness of this air gap therein. In this case, a plate is mounted on the moving body 16 instead of the movable core portion 16 for the piezoelectric actuator 15. Even if employing such a constitution, it becomes possible to change the cross-section area of the magnetic gap 19 for the magnetic circuit and to change the inductance value.

Third Exemplified Embodiment

Next, it will be explained with respect to a constitution example of a coil component 40 relating to a third exemplified embodiment of the present invention with reference to FIG. 9 and FIG. 10.

Figure 9:
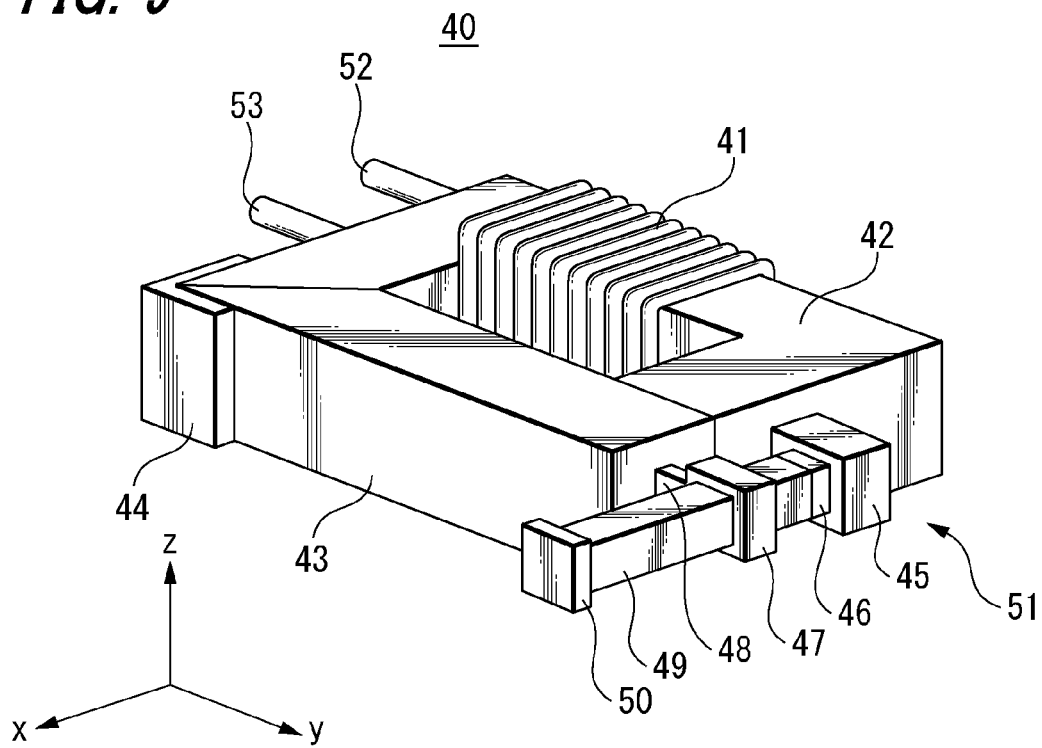
FIG. 9 is a constitution diagram showing an example of a coil component in a third exemplified embodiment of the present invention.

FIG. 9 shows a perspective view of the coil component 40.

The coil component 40 includes a U-shaped core 42 formed in a U-shape and a movable core 43 which is combined with both the terminal portions of the U-shaped core 42. One terminal of the U-shaped core 42 and one terminal of the movable core 43 are connected by means of a connection unit 44. The other terminal of the U-shaped core 42 is cut out obliquely and surface-contacts with the other terminal of the movable core 43 which is formed in a trapezoid shape by way of the corresponding oblique side thereof. A coil 41 is wound around one side of the U-shaped core 42. The electric conductive wire used for the coil 41 is similar to that of the coil 10 relating to the first exemplified embodiment mentioned above, so that the detailed explanation thereof will be omitted. The U-shaped core 42 and the movable core 43 are formed by using a material of a sintered ferrite or a metal-based magnetic material or the like. Also, the U-shaped core 42 and the movable core 43 have high magnetic permeability and have a characteristic for the magnetic flux to pass easily therethrough. Then, the U-shaped core 42 functions as a core portion of the coil 41 and forms a closed magnetic-path structure together with the movable core 43. Consequently, the U-shaped core 42 and the movable core 43 heighten the magnetic permeability of the coil 41 and concurrently, repress the leakage magnetic flux thereof.

Also, the coil component 40 includes a piezoelectric actuator 51 for driving a piezoelectric device 46. The piezoelectric actuator 51 includes the piezoelectric device 46, a moving body 47 and a friction-drive rod 49.

Also, the coil component 40 includes an actuator base 45 which is fixed by an adhesive agent in a vicinity of the center on the surface directed to the +y direction of the U-shaped core 42. Similarly, the coil component 40 includes a support portion which is fixed by an adhesive agent in a vicinity of the center of the surface directed to the +y direction of the movable core 43. The actuator base 45 supports one end portion of the piezoelectric device 46 which expands and contracts by the application of voltage. On the other hand, at the other end portion of the piezoelectric device 46, there is mounted the friction-drive rod 49. The friction-drive rod 49 is fixed by the support portion 48 and has a function for coupling the movable core 43 to the moving body 47.

The piezoelectric actuator 51 is installed on the other terminal of the U-shaped core 42 and on the other terminal of the movable core 43, and by setting a place at which one terminal of the U-shaped core 42 and one terminal of the movable core 43 are connected (connection unit 44 in this embodiment) to be a supporting point, the relative position between the other terminal of the U-shaped core 42 and the other terminal of the movable core 43 is to be changed along with the movement of the moving body 47. Thus, the piezoelectric actuator 51 forms a magnetic gap for the magnetic flux generated by the coil 41.

The piezoelectric device 46 is a vibrator which is mounted between the actuator base 45 and the friction-drive rod 49. The constitution and the action of the piezoelectric device 46 are similar to those of the piezoelectric device 9 relating to the first exemplified embodiment mentioned above, so that the detailed explanations thereof will be omitted.

The friction-drive rod 49 is installed in a state of floating on the air. A moving body stopper 50 which prevents the moving body 47 from dropping out from the friction-drive rod 49 is installed at the end portion of the friction-drive rod 49. The approximately L-shaped connection unit 44 has a function for connecting the U-shaped core 42 and the movable core 43. In this regard, the long side of the L-shape of the connection unit 44 is bonded to the U-shaped core 42, but the short side thereof is only closely-contacted to the outside of the movable core 43 and is not adhesively fixed. Then, it is possible for the connection unit 44 to prevent the movable core 43 from dropping out from the U-shaped core 42 along with the opening & closing operation of the movable core 43. Also, the connection unit 44 has a simple shape, so that it is easy to be mechanically processed and furthermore, there is a contribution on space saving of the coil component 30. In addition, when the U-shaped core 42 and the movable core 43 are connected by using the connection unit 44, there is an advantage of not affecting influence on the magnetic permeability of these magnetic cores, or the like.

On the surface directed to the −y direction of the U-shaped core 42, there are formed a pair of inductor electrodes which are connected to both the ends of the coil 41. The inductor electrode 52 are electrodes which are connected to an external mounting substrate or the like. Similarly, on the surface directed to the −y direction of the U-shaped core 42, there are formed a pair of actuator electrodes 53 which are connected to the actuator base 45. The actuator electrodes 53 supply voltage to the actuator base 45 and controls the drive of the piezoelectric device 46.

Figure 10A:
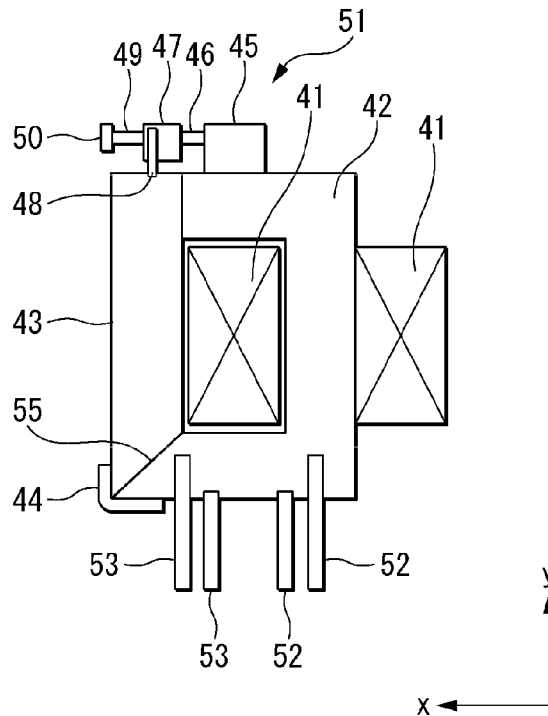
FIGS. 10A and 10B are explanatory diagrams showing an operation example of the coil component in the third exemplified embodiment of the present invention.
Figure 10B:
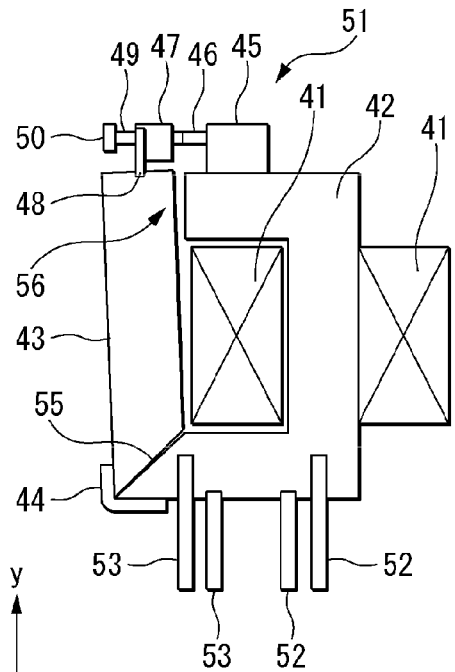

FIGS. 10A and 10B show an operation example of the coil component 40.

FIG. 10A shows an example of the coil component 40 in an initial state.

At that time, inclined surfaces 55 of the U-shaped core 42 and the movable core 43 are in a state of being contacted with each other. Then, the magnetic gap does not occur, so that the inductance value becomes maximum.

FIG. 10B shows an example of the coil component 40 in a state of applying a voltage to the piezoelectric device 46.

At that time, caused by a phenomenon that the piezoelectric device 46 is extended, the movable core 43 moves toward the +x direction. Then, when the voltage which is applied to the piezoelectric actuator 51 disappears quickly, the piezoelectric device 46 returns to the original position, but the moving body 47 becomes stationary in a state of being displaced toward the +x direction owing to the frictional force of the friction-drive rod 49. At that time, a space occurs between the inclined surfaces 55 of the U-shaped core 42 and the movable core 43. However, the U-shaped core 42 and the movable core 43 are fixed by the connection unit 44, so that they become stationary while keeping the space between the inclined surfaces 55. Then, with respect to the U-shaped core 42 and the movable core 43, the inductance value becomes smaller caused by the magnetic gap 56 which carries out opening & closing operation caused by the application of the voltage.

According to the coil component 40 relating to the third exemplified embodiment explained above, it is possible, by connecting one terminal of the movable core 43 to one terminal of the U-shaped core 42 through the connection unit 44, to move the other terminal of the movable core 43. Thus, it is possible to move away the other terminal of the movable core 43 from the other terminal of the U-shaped core 42 by the piezoelectric actuator 51. Consequently, it is possible to adjust the inductance value of the coil component 40 by forming the magnetic gap 56.

Also, the constitution of the coil component 40 is simple, so that the manufacturing thereof is easy although the number of components is small. Consequently, it is possible to lower the manufacturing cost. In addition, when lowering the voltage applied to the piezoelectric actuator 51 gradually, the movable core 43 moved to a predetermined position stays at that position. Consequently, it is not necessary to continue applying the voltage in order to stand still the movable core 43 and there is such an effect in which it is possible to accomplish power saving.

Fourth Exemplified Embodiment

Next, it will be explained with respect to constitution examples of a coil component 60 relating to fourth and fifth exemplified embodiments of the present invention with reference to FIG. 11 and FIG. 12.

Figure 11:
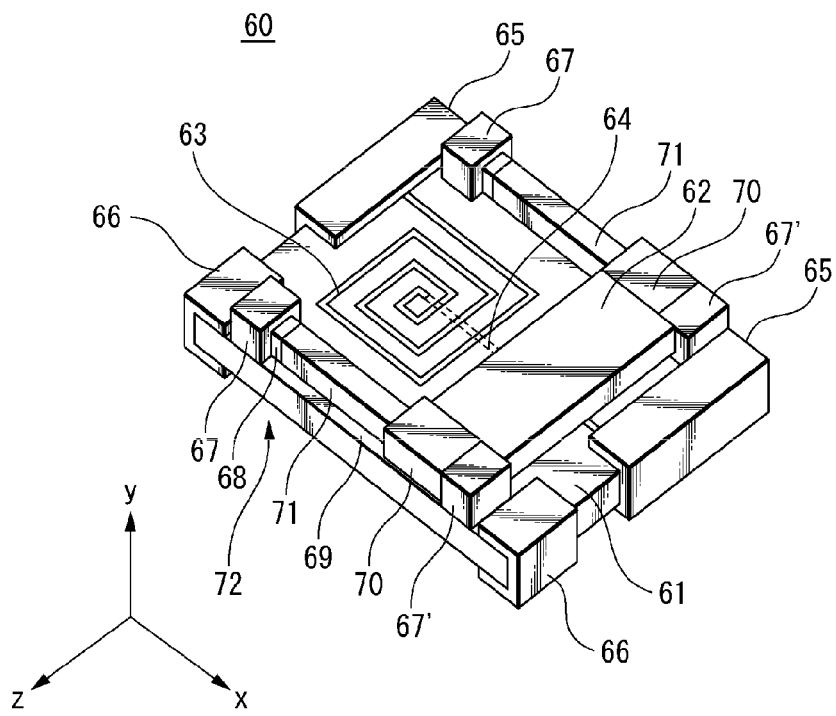
FIG. 11 is a constitution diagram showing an example of a coil component in a fourth exemplified embodiment of the present invention.

FIG. 11 shows a perspective view of the coil component 60.

The coil component 60 includes an insulating substrate 61, a movable core 62 and a flat coil 63. The insulating substrate 61 is approximately a rectangular insulation sheet and generally, there are many cases in which it is formed by a heat resistant resin material. On the surface of the insulating substrate 61, there is arranged the flat coil 63 by using a method such as a plating method, an etching method of copper foil, a printing method or a PVD (PVD: Physical Vapor Deposition) method, and the like.

The coil component 60 includes inductor connection electrodes 65 which are connection electrodes connected to an external mounting substrate and actuator connection electrodes 66 which are electrodes for supplying voltage to the actuator. The inductor connection electrodes 65 are electrodes connected to both the ends of the flat coil 63 and are arranged on two different corners of the insulating substrate 61, respectively. On the other hand, the actuator connection electrodes 66 are arranged on two corners which are different from those for the inductor connection electrodes 65 in the insulating substrate 61.

The flat coil 63 is formed in a spiral shape and has a substrate-internal wiring 64 which gets into under the inside of the insulating substrate 61 from a vicinity of the center of the spiral. The substrate-internal wiring 64 is arranged in the inner layer of the substrate such that one end of the coil which lies in the center of the flat coil 63 can be connected to an external electrode. Also, the in the center gets into under the insulation-resin substrate under the flat coil 63 and one end thereof is connected to the center end of the flat coil 63 and the other end thereof is connected to the inductor connection electrode 65.

Also, the coil component 60 includes a piezoelectric actuator 72 for driving a piezoelectric device 68. At least on one side within two sides facing each other which exist on the periphery of the insulating substrate 61, there are arranged a moving body 70 as a first moving body, a friction-drive rod 71 as a first stationary unit and the piezoelectric device 68, which are included in the piezoelectric actuator 72. On the other one side thereof, there are arranged a moving body 70 as a second moving body and a friction-drive rod 71 as a second stationary unit. The movable core 62 is supported on the surface of the insulating substrate 61 on which the flat coil 63 is arranged by being sandwiched with two pieces of the moving bodies 70. A gauge rod 69 is shown as one example of an orbit rod and the moving body 70 is movable toward the ±x directions along the gauge rod 69 which is installed on the side surface of the insulating substrate 61.

Also in this embodiment, two pieces of the moving bodies 70 move toward the direction perpendicular to the winding axis direction of the flat coil 63 in response to the displacement which occurs for the piezoelectric device 68 and the magnetic flux generated by the flat coil 63 passes through the movable core 62. Specifically, owing to a fact that the voltage is applied to the piezoelectric device 68, the piezoelectric device expands and contracts toward the ±x directions. Along with these expansion and contraction, the moving body 70 moves toward the ±x directions. As a result thereof, the movable core 62 moves toward the ±x directions. When the movable core 62 moves, the amount of magnetic flux which passes through the flat coil 63 changes, so that the inductance value of the coil component 60 changes.

Also, the coil component 60 includes actuator bases 67 for supporting the piezoelectric device 68 and the friction-drive rods 71. The actuator bases 67 are formed by an insulation material of a resin or the like and are installed on the four corners of the insulating substrate 61. The actuator bases 67, 67' are arranged between the inductor connection electrodes 65 and between the actuator connection electrodes 66 by maintaining a constant distance for insulation. It should be noted that in a case in which insulation properties of the actuator bases 67, 67' themselves are sufficiently high, there can be expected a space saving effect depending on the contacting with the electrodes.

FIGS. 12A, 12B, 12C and 12D show an operation example of the coil component 60.

Figure 12A:
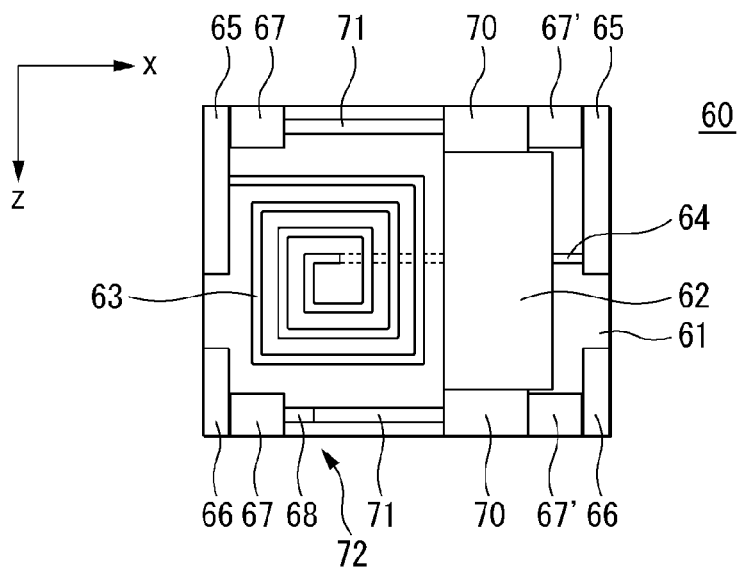
FIGS. 12A, 12B, 12C and 12D are constitution diagrams showing an example of a coil component in fourth and fifth exemplified embodiments of the present invention.

FIG. 12A shows an example of the coil component 60 in an initial state.

In the initial state, the piezoelectric actuator 72 is not driven, so that the moving body 70 becomes stationary in a state of being contacted to the actuator base 67'. At that time, the magnetic flux generated by the flat coil 63 hardly passes through the movable core 62.

Figure 12B:
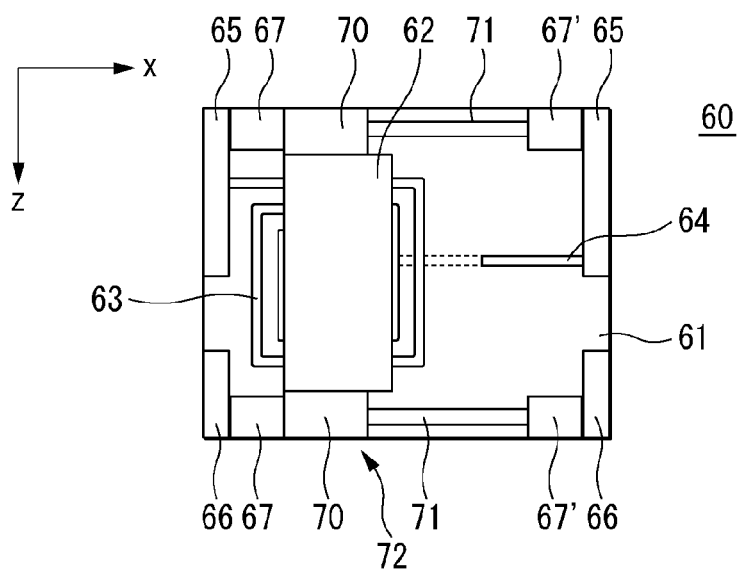

FIG. 12B shows an example of the coil component 60 after applying the voltage.

When the piezoelectric actuator 72 is driven, the moving body 70 moves gradually toward the −x direction. In this embodiment, the moving body 70 moves until it approximately entirely covers the upper surface of the flat coil 63.

When the movable core 62 installed on the moving body 70 approaches to the flat coil 63 caused by the operation of the piezoelectric actuator 72, the amount of magnetic fluxes which form the closed magnetic-path through the movable core 62 becomes greater and the inductance value becomes larger. On the other hand, when the movable core 62 installed on the moving body 70 is moved away from the flat coil 63, the amount of magnetic fluxes which become the closed magnetic-path through the movable core 62 becomes smaller and the inductance value becomes smaller. Caused by this operation, the inductance value of the coil component 60 can be changed.

Figure 12C:
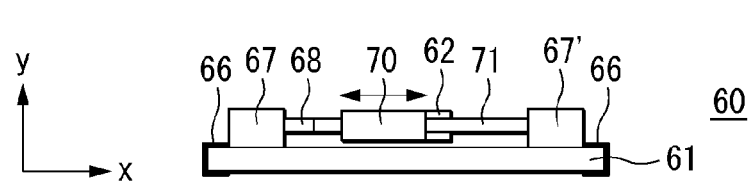

FIG. 12C shows an example in which the coil component 60 shown in FIG. 12B is side-viewed from the +z direction.

From this drawing, it is shown that the movable core 62 placed on the moving body 70 is movable toward the ±x directions.

Fifth Exemplified Embodiment

Figure 12D:
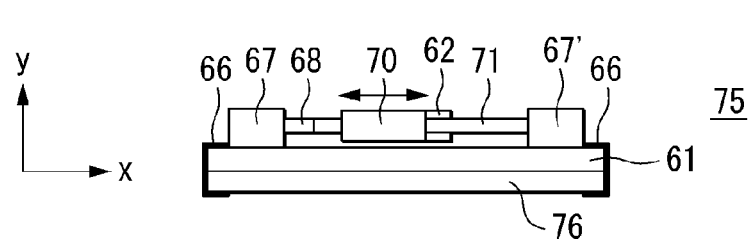

FIG. 12D shows a constitution example of a coil component relating to a fifth exemplified embodiment of the present invention.

However, the basic constitution and operation of the coil component 75 are similar to those of the coil component 60 relating to the fourth exemplified embodiment mentioned above. Consequently, in the following explanation, the same reference numerals are put on the portions corresponding to those in FIG. 11, which were already explained in the fourth exemplified embodiment and the detailed explanations thereof will be omitted.

The coil component 75 of this embodiment is provided, on the rear surface with respect to the front surface on which the flat coil 63 is arranged within the insulating substrate 61, with a magnetic body 76 which approximately covers that rear surface. Owing to the magnetic body 76, a portion of the magnetic fluxes which leaked will pass through the lower surface of the insulating substrate 61 and a closed magnetic-path will be formed. Consequently, it is possible to obtain a larger inductance value than that of the coil component 60 relating to the fourth exemplified embodiment mentioned above and also, it is possible to widen the variation range of the inductance value.

According to the coil component 60 relating to the fourth exemplified embodiment and the coil component 75 relating to the fifth exemplified embodiment explained above, both the terminals of the movable core 62 are connected to the two pieces of the moving bodies 70 respectively. It is possible for the moving body 70 to move on the friction-drive rod 71 along the gauge rod and it is possible to change the movement amount of the movable core 62 arbitrarily by the piezoelectric actuator 72. As a result thereof, by stopping the movable core 62 at a desired position and by passing the magnetic fluxes generated by the flat coil 63 through the movable core 62, it is possible to adjust the inductance value.

Also, the constitutions of the coil components 60, 75 are simple, so that the manufacturing thereof is easy although the number of components is small. Consequently, it is possible to lower the manufacturing cost. In addition, in case of gradually lowering the voltage applied to the piezoelectric actuator, the movable core 62 moved to a predetermined position stays at that position. Consequently, it is not necessary to continue applying the voltage in order to stand still the movable core 62 and there is such an effect in which it is possible to accomplish power saving.

Sixth Exemplified Embodiment

Next, it will be explained with respect to a constitution example of a coil component 80 relating to a sixth exemplified embodiment of the present invention with respect to FIG. 13. However, the basic constitution and operation of the coil component 80 are similar to those of the coil component 60 relating to the fourth exemplified embodiment mentioned above. Consequently, in the following explanation, the same reference numerals are put on the portions corresponding to those in FIG. 11, which were already explained in the fourth exemplified embodiment and the detailed explanations thereof will be omitted.

FIGS. 13A, 13B, 13C and 13D show an operation example of the coil component 80.

Figure 13A:
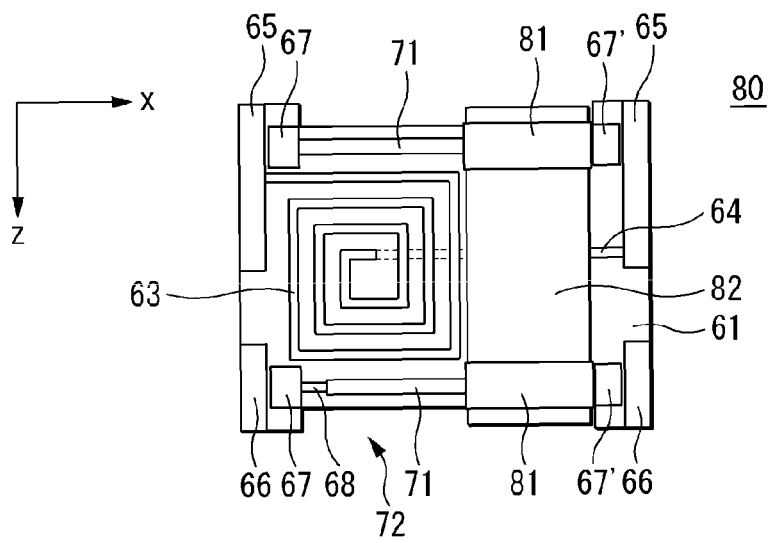
FIGS. 13A, 13B, 13C and 13D are constitution diagrams showing an example of a coil component in a sixth exemplified embodiment of the present invention.

FIG. 13A shows an example of the coil component 80 in an initial state.

In the initial state, the piezoelectric actuator 72 is not driven, so that the moving body 81 becomes stationary in a state of being contacted to the actuator base 67'. At that time, the magnetic flux generated by the flat coil 63 hardly passes through the movable core 62.

Figure 13B:
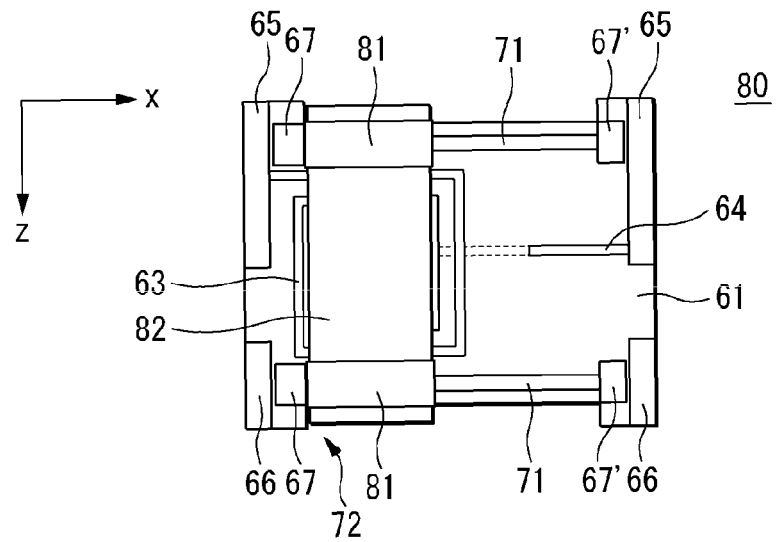

FIG. 13B shows an example of the coil component 80 after applying the voltage.

When the piezoelectric actuator 72 is driven, the moving body 70 moves gradually toward the −x direction. In this embodiment, the moving body 70 moves until it approximately entirely covers the upper surface of the flat coil 63.

When the movable core 62 installed on the moving body 81 approaches to the flat coil 63 caused by the operation of the piezoelectric actuator 72, the amount of magnetic fluxes which form the closed magnetic-path through the movable core 62 becomes greater and the inductance value becomes higher. On the other hand, when the movable core 62 installed on the moving body 81 is moved away from the flat coil 63, the amount of magnetic fluxes which become the closed magnetic-path through the movable core 62 becomes small or the inductance value becomes small. Caused by this operation, the inductance value of the coil component 80 can be changed.

Figure 13C:
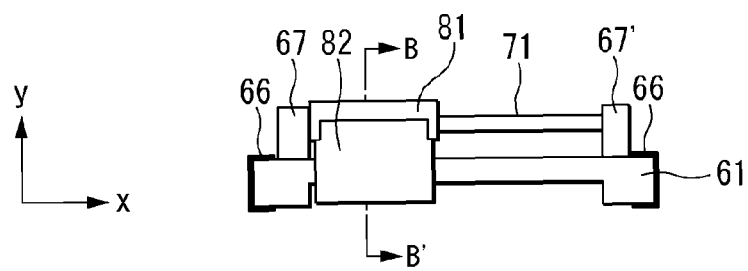

FIG. 13C shows an example in which the coil component 80 shown in FIG. 13B is side-viewed from the +z direction.

From this drawing, it is shown that the movable core 62 placed on the moving body 81 is movable toward the ±x directions.

Figure 13D:
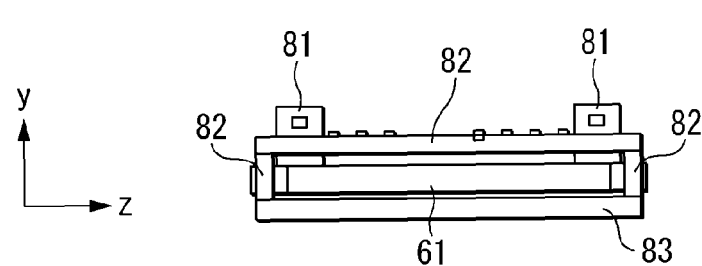

FIG. 13D shows a constitution example of the moving body 81 from an example of a cross-section diagram along a B-B' line of the coil component 80 in FIG. 13C.

The movable core 83 is sandwiched and supported by the two pieces of moving bodies 82, 83 on the rear surface with respect to the front surface on which the flat coil 63 is arranged within the insulating substrate 61. From FIG. 13D, it is shown that the periphery of the insulating substrate 61 and the flat coil 63 is covered by the moving bodies 82, 83 which are formed by magnetic bodies and is formed in a ring shape. Owing to these moving bodies 82, 83, a portion of the magnetic fluxes which leaked through the lower surface of the insulating substrate 61 becomes a closed magnetic-path such as the coil component 60 relating to the fourth exemplified embodiment. Consequently, it is possible for the coil component 80 to obtain a larger inductance value and also, a larger inductance variation range than those of the coil component 60. Also, it is possible for the coil component 80 to control the amount of the magnetic fluxes passing through the lower surface of the insulating substrate 61 by a larger range than that of the coil component 75 relating to the fifth exemplified embodiment, so that it is possible to make the variation range of the inductance wider.

Figure 14:
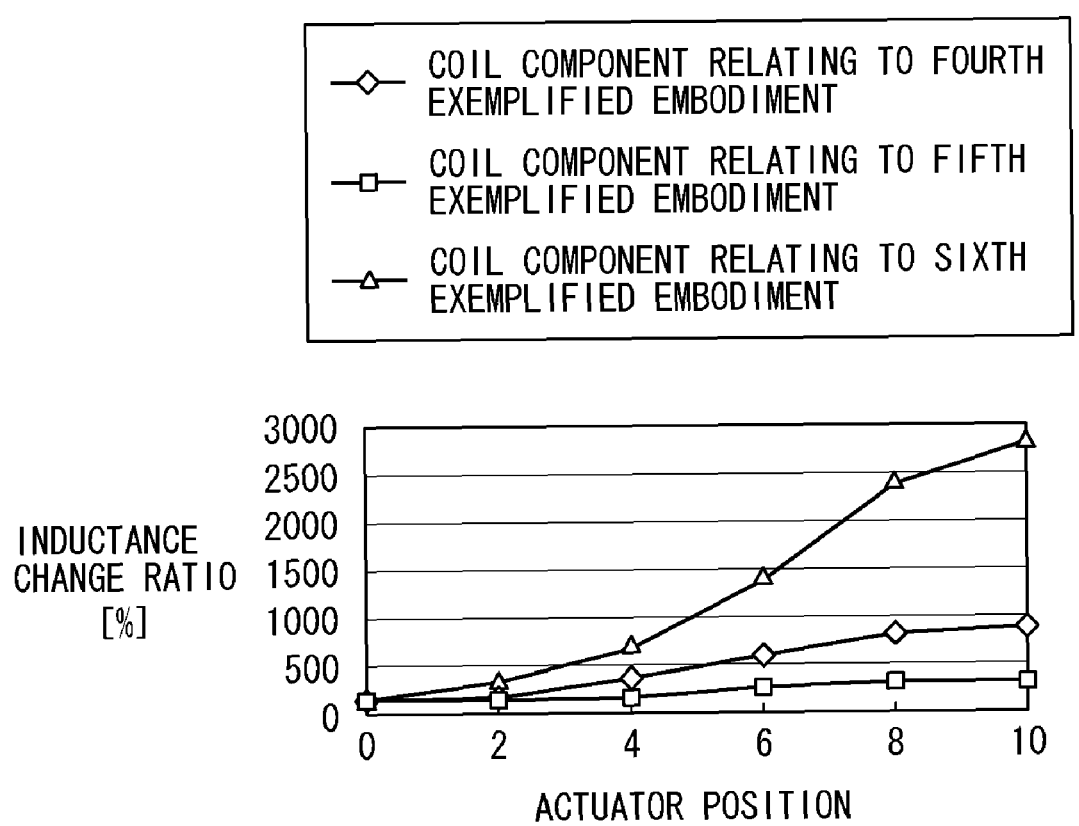
FIG. 14 is an explanatory diagram showing an example of change ratios of inductance values with respect to the positions of the piezoelectric actuators of the coil components in the fourth to sixth exemplified embodiments of the present invention.

FIG. 14 shows an example of the relation between the actuator position and the inductance value in the coil component 60 relating to the fourth exemplified embodiment, in the coil component 75 relating to the fifth exemplified embodiment and in the coil component 80 relating to the sixth exemplified embodiment.

The wording "actuator position" expresses a positional relation of the moving body 70, 81 in a case in which the maximum moving distance (termination point) of the moving body 70, 81 is assumed to be 10, the minimum moving distance is assumed to be 0 (starting point) and the space between the starting point and the termination point is equally divided by 10 positions.

As shown in FIG. 14, it is indicated, with respect to the coil component 75 relating to the fifth exemplified embodiment, that the change ratio of the inductance value heightens along with a fact that the actuator position becomes larger when compared with the coil component 60 relating to the fourth exemplified embodiment. Further, it is indicated, with respect to also the coil component 80 relating to the sixth exemplified embodiment, that the change ratio of the inductance value heightens along with a fact that the actuator position becoming larger when compared with the coil component 75 relating to the fifth exemplified embodiment.

From the result mentioned above, it is shown that it is possible to change the change ratio of the inductance value largely by arranging a magnetic body at the periphery of the flat coil 63.

It should be noted with respect to the coil component relating to the present invention that it is possible to carry out adjustment of the inductance accurately at the time of use by using means of a Hall element or the like by controlling a circuit constant, by detecting the position of the movable core portion 11 or the movable magnetic body, by controlling the drive pulse and the like. Consequently, it becomes easy to mass-produce coil components having the same quality.

In addition, also in the coil components relating to the second to sixth exemplified embodiment mentioned above, similarly as in the coil component 1 relating to the first exemplified embodiment, it is allowed to use monomorph type or bimorph type piezoelectric devices for the piezoelectric devices which are used for the actuators. Thus, it is possible to obtain a coil component in which although power saving is attained, there can be concurrently carried out adjustment of the inductance easily.

DESCRIPTION OF REFERENCE NUMERALS

1: coil component; 2: pot core; 3: actuator connection electrode; 4: inductor connection electrode; 5: coil terminal portion; 6: flat plate core; 7: fixed core portion; 8: fixed core portion; 9: piezoelectric device; 10: coil; 11: movable core portion; 12: actuator base; 13: friction-drive rod; 14: rectangle hole; 15: piezoelectric actuator; 16: moving body; 17: magnetic path; 18: same axis line; 19: magnetic gap; 20: voltage source; 21: external electrode; 22: laminated piezoelectric body; 23: internal electrode; 30: coil component; 31: holding base; 32: movable core portion; 33: magnetic path; 34: same axis line; 35: magnetic gap; 36: fixed gap; 40: coil component; 41: coil; 42: U-shaped core; 43: movable core; 44: connection unit; 45: actuator base; 46: piezoelectric device; 47: moving body; 48: support portion; 49: friction-drive rod; 50: moving body stopper; 51: piezoelectric actuator; 52: inductor electrode; 53: actuator electrode; 55: inclined surface; 56: magnetic gap; 60: coil component; 61: insulating substrate; 62: movable core; 63: flat coil; 64: wiring within substrate; 65: inductor connection electrode; 66: actuator connection electrode; 67, 67': actuator bases; 68: piezoelectric device; 69: gauge rod; 70: moving body; 71: friction-drive rod; 72: piezoelectric actuator; 75: coil component; 76: magnetic body; 80: coil component; 81, 82: moving bodies; 83: movable core

The invention claimed is:
1. A coil component including:
a magnetic core;
a coil for generating magnetic flux when a predetermined electric current is supplied;
an actuator for changing the position of a movable core with respect to said coil in response to a control signal supplied from the outside and for passing said movable core through the magnetic flux generated by said coil, wherein
said actuator comprising:
a piezoelectric device for creating displacement in parallel with the thickness direction caused by said control signal,
a moving body connected to said movable core for moving said movable core in response to the displacement which occurred for said piezoelectric device, and
a stationary unit connected to said piezoelectric device and said moving body for rendering said moving body moved by the displacement which occurred for said piezoelectric device to be stationary at a predetermined position.

2. The coil component according to claim 1, wherein
said coil is housed inside a pot core composed of a magnetic body in which at least one surface thereof is formed as an opening portion and inside a flat plate core composed of said magnetic body which is placed by being fitted with said opening portion,
there is formed, inside said pot core and said flat plate core, with a core portion fitted with the shape of said movable core along the winding axis direction of said coil,
said actuator is installed on said flat plate core, and
said moving body is installed in a through-hole formed by being passed through said flat plate core in a direction parallel with the displacement direction of said piezoelectric device.

3. The coil component according to claim 2, wherein
in a case in which the voltage applied to said piezoelectric device is raised, said piezoelectric device is extended in parallel with said thickness direction and said stationary unit renders said moving body to be stationary at a displacement position which occurs for said piezoelectric device,
in a case in which the voltage applied to said piezoelectric device is lowered in a short time period compared with the time period during which said voltage is applied, said piezoelectric device returns to one having the original length by being shrunk in parallel with said thickness direction, and said stationary unit renders said moving body to be stationary in a vicinity of the position of the displacement which occurs for said piezoelectric device.

4. The coil component according to claim 3, wherein said flat plate core further comprises a holding portion for holding said stationary unit.

5. The coil component according to claim 1, wherein
said magnetic core is formed by a U-shaped core which is formed in a U-shape,
said movable core is formed by said movable core which is combined with both the terminal portions of said U-shaped core,
said coil is wound around one side of said U-shaped core,
one terminal of said U-shaped core and one terminal of said movable core are connected,
said actuator is installed at the other terminal of said U-shaped core and at the other terminal of said movable core, and
a magnetic gap of the magnetic flux generated by said coil is formed along with the move of said moving body by setting the place to which one terminal of said U-shaped core and one terminal of said movable core are connected to be a supporting point and by changing the relative position with respect to the other terminal of said U-shaped core and the other terminal of said movable core.

6. The coil component according to claim 1, further comprising a substrate arranged with said coil, wherein
there are arranged, at the periphery of said substrate and at least on one side within two sides facing to each other, with said piezoelectric device, a first moving body and a first stationary unit as said actuator,
there are arranged, on the other one side, with a second moving body and a second stationary unit,
said movable core is supported by said first and second moving bodies which are on the surface of said substrate arranged with said coil,
said first moving body and said second moving body connected to said movable core move in the direction perpendicular to the winding axis direction of said coil in response to the displacement which occurred for said piezoelectric device, and
said movable core passes through the magnetic flux generated by said coil.

7. The coil component according to claim 6, further comprising: a magnetic body approximately covering said rear surface on the rear surface with respect to the surface arranged with said coil within said substrate.

8. The coil component according to claim 6, further comprising: a second movable core supported by said first and second moving bodies on the rear surface with respect to the surface arranged with said coil within said substrate.

9. The coil component according to claim 8, wherein
said piezoelectric device is a monomorph type or bimorph type piezoelectric device.

10. The coil component according to claim 7, further comprising: a second movable core supported by said first and second moving bodies on the rear surface with respect to the surface arranged with said coil within said substrate.

11. The coil component according to claim 10, wherein
said piezoelectric device is a monomorph type or bimorph type piezoelectric device.

* * * * *